(12) United States Patent
Abramovitz et al.

(10) Patent No.: US 10,904,777 B2
(45) Date of Patent: Jan. 26, 2021

(54) METHOD OF COMMUNICATION FAILURE REPORTING AND CORRESPONDING APPARATUS

(71) Applicant: INTERDIGITAL CE PATENT HOLDINGS, Paris (FR)

(72) Inventors: Assi Abramovitz, Netanya (IL); Koen Van Oost, Borsbeek (BE)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 16/017,979

(22) Filed: Jun. 25, 2018

(65) Prior Publication Data

US 2019/0007847 A1 Jan. 3, 2019

(30) Foreign Application Priority Data

Jun. 28, 2017 (EP) .................................... 17305808

(51) Int. Cl.
*H04W 24/04* (2009.01)
*H04L 12/24* (2006.01)
(Continued)

(52) U.S. Cl.
CPC ......... *H04W 24/04* (2013.01); *H04L 41/0213* (2013.01); *H04L 41/069* (2013.01);
(Continued)

(58) Field of Classification Search
CPC ..... H04W 24/04; H04W 48/10; H04W 84/12; H04L 41/0668; H04L 41/069;
(Continued)

(56) References Cited

U.S. PATENT DOCUMENTS 7,035,202 B2 * 4/2006 Callon ................ G06F 11/2294
370/216
8,621,067 B2 12/2013 Fan et al.
(Continued)

FOREIGN PATENT DOCUMENTS

CN 102740337 10/2012
CN 103874114 6/2014
(Continued)

OTHER PUBLICATIONS

Anonymous, "Part 11:Wireless LAN Medium Access Control (MAC) and Physical Layer (PHY) specifications", IEEE Std 802.11-1997, Information Technology—Telecommunications and information exchange between systems—Local and Metropolitan area networks—Specific requirements, Jun. 26, 1997, pp. 1-459.

*Primary Examiner* — Dady Chery
(74) *Attorney, Agent, or Firm* — Volpe Koenig

(57) ABSTRACT

When a failure is detected of a communication link between a wireless access point and a service provider providing services to devices in proximity of said wireless access point, a probe request message is broadcasted on one or more wireless communication channels. The broadcasted probe request message includes a particular payload enabling the message to be identified as being a distress message reporting a failure of the communication link. Another wireless access point within wireless communication reach receiving a distress message may transfer a communication link failure report to the service provider in place of the wireless access point of which the communication link fails.

17 Claims, 10 Drawing Sheets

(51) Int. Cl.
*H04L 12/26* (2006.01)
*H04W 48/10* (2009.01)
*H04W 84/12* (2009.01)

(52) U.S. Cl.
CPC ...... *H04L 41/0668* (2013.01); *H04L 41/0681* (2013.01); *H04L 41/0686* (2013.01); *H04L 43/06* (2013.01); *H04L 43/10* (2013.01); *H04W 48/10* (2013.01); *H04L 43/0811* (2013.01); *H04W 84/12* (2013.01)

(58) Field of Classification Search
CPC ............. H04L 41/0681; H04L 41/0213; H04L 41/0686; H04L 43/10; H04L 43/06; H04L 43/0811
See application file for complete search history.

(56) References Cited

U.S. PATENT DOCUMENTS

| | | |
|---|---|---|
| 2008/0080365 A1 | 4/2008 | Weeresinghe |
| 2015/0305082 A1 | 10/2015 | Elliot et al. |
| 2015/0319628 A1* | 11/2015 | Elliott ................... H04W 24/04 370/225 |
| 2016/0360430 A1* | 12/2016 | Stevens ................. H04W 76/10 |

FOREIGN PATENT DOCUMENTS

| | | |
|---|---|---|
| EP | 2919505 | 9/2015 |
| EP | 3043595 | 7/2016 |
| KR | 1020140148286 | 12/2014 |

* cited by examiner

Table 8-26—Probe Request frame body

| Order | Information | Notes |
|---|---|---|
| 1 | SSID | If dot11MeshActivated is true, the SSID element is the wildcard value as described in 8.4.2.2. |
| 2 | Supported rates | |
| 3 | Request information | The Request element is optionally present if dot11MultiDomainCapabilityActivated is true. |
| 4 | Extended Supported Rates | The Extended Supported Rates element is present if there are more than eight supported rates, and is optionally present otherwise. |
| 5 | DSSS Parameter Set | The DSSS Parameter Set element is present within Probe Request frames generated by STAs using Clause 16, Clause 17, or Clause 19 PHYs if dot11RadioMeasurementActivated is true. The DSSS Parameter Set element is present within Probe Request frames generated by STAs using a Clause 20 PHY in the 2.4 GHz band if dot11RadioMeasurementActivated is true.<br><br>The DSSS Parameter Set element is optionally present within Probe Request frames generated by STAs using Clause 16, Clause 17, or Clause 19 PHYs if dot11RadioMeasurementActivated is false. The DSSS Parameter Set element is optionally present within Probe Request frames generated by STAs using a Clause 20 PHY in the 2.4 GHz band if dot11RadioMeasurementActivated is false. |
| 6 | Supported Operating Classes | The Supported Operating Classes element is present if dot11ExtendedChannelSwitchActivated is true. |
| 7 | HT Capabilities | The HT Capabilities element is present when dot11HighThroughputOptionImplemented attribute is true. |
| 8 | 20/40 BSS Coexistence | The 20/40 BSS Coexistence element is optionally present when the dot1120/40BSSCoexistenceManagementSupport attribute is true. |
| 9 | Extended Capabilities | The Extended Capabilities element is optionally present if any of the fields in this element are nonzero. |
| 10 | SSID List | The SSID List element is optionally present if dot11MgmtOptionSSIDListActivated is true. |
| 11 | Channel Usage | The Channel Usage element is optionally present if dot11MgmtOptionChannelUsageActivated is true. |
| 12 | Interworking | The Interworking element is present if dot11InterworkingServiceActivated is true. |
| 13 | Mesh ID | The Mesh ID element is present if dot11MeshActivated is true. |
| Last | Vendor Specific | One or more vendor-specific elements are optionally present. These elements follow all other elements. |

Fig. 5

METHOD OF COMMUNICATION FAILURE REPORTING AND CORRESPONDING APPARATUS

REFERENCE TO RELATED EUROPEAN APPLICATION

This application claims priority from European Patent Application No. 17305808.2, entitled "METHOD OF COMMUNICATION FAILURE REPORTING AND CORRESPONDING APPARATUS", filed on Jun. 28, 2017, the contents of which are hereby incorporated by reference in its entirety.

FIELD

The present disclosure generally relates to the field of reporting of communication failure experienced by a device, for diagnostics and repair.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

Typically, user terminals such as Set Top Boxes (STB), High-Definition Televisions (HDTV) and Internet Protocol telephone sets will connect to a Service Provider (SP) through a Local Area Network (LAN) controlled by an Access Point (AP) or GateWay (GW) provided by the service provider. The gateway offers wireless and wired communication for connecting the LAN devices. The gateway further has a network interface that enables it to be connected to a Wide Area Network (WAN) for connection to the Internet and in particular for connection to a server of the service provider. The connection to the WAN is for example according to Data Over Cable Service Interface Specification (DOCSIS), Digital Subscriber Line (DSL), Fiber To The Home (FTTH) or Long-Term Evolution (LTE). The gateway may be managed remotely by the service provider via the link using Simple Network Management Protocol (SNMP) or Technical Report 069 (TR-069) like remote device management protocols. For the service provider, a failure of this communication link to the subscriber's gateway seriously disrupts the provision of services to the subscriber. During prolonged failure, the service provider has no means to reach the gateway and diagnose and repair the failure. Typically, in such a case, the subscriber will notice the connection loss and possibly reboot the gateway. If that doesn't help, the subscriber will have to contact the service provider's helpdesk, for example using his mobile phone, and the helpdesk will guide the user through a series of diagnostic tests to find the cause of the connection failure in the hope of being able to restore the lost connection. If the subscriber has no basic technical knowledge, the intervention of the helpdesk can be very difficult. For both the subscriber and the service provider, a loss of the connection between the service provider and the gateway is therefore annoying.

There is thus a need for a solution to improve detection of connection failure and establishment of connection failure diagnostics that does not require intervention of the subscriber.

SUMMARY

According to one aspect of the present disclosure, there is provided a method of communication failure reporting. The method is implemented by a first access point device and includes detecting by the first access point device a failure of the first access point device to communicate via a wide area network interface of the first access point device with a service provider of the first access point device. The method further includes sending by the first access point device and via a wireless local area network interface of the first access point device, at least one probe request message on at least one wireless communication channel, the at least one probe request message comprising a payload enabling the at least one probe request message to be identified by at least a second access point device as a distress message representative of a reporting of the failure of the first access point device to communicate with the service provider via the wide area network interface of the first access point device, for reporting, by the at least a second access point device, the failure to the service provider.

According to a further aspect of the method of communication failure reporting, the method further includes selecting, for the sending of at least one probe request message, at least one wireless communication channel on which a probe response message was received in reply to a probe request message previously sent by the first access point device for scanning wireless local area networks in proximity of the first access point device.

According to a further aspect of the method of communication failure reporting, the method further includes selecting, for the sending of at least one probe request message, at least a second access point device having a same service provider as the first access point device, the same service provider being identified from information comprised in the probe response message.

According to a further aspect of the method of communication failure reporting, the payload further comprises a Medium Access Control address of the wide area network interface of the first access point device.

According to a further aspect of the method of communication failure reporting, the payload further comprises an Internet Protocol address of the first access point device.

According to a further aspect of the method of communication failure reporting, the payload further comprises parameters of the first access point device, formatted according to a Technical Report 069 data model.

According to a further aspect of the method of communication failure reporting, the payload further comprises parameters of the first access point device, formatted according to a Simple Network Management Protocol.

The present principles also relate to a method of communication failure reporting implemented by a second access point device. The method comprises receiving, from a first access point device, on a wireless communication channel used by the second access point device for a local area network of the second access point device, at least one probe request message. The method further comprises reporting, via a wide area network interface of the second access point device, to a service provider of the first access point device, a failure of the first access point device to communicate with the service provider when the at least one probe request message comprises a payload identifying the at least one probe request message as a distress message representative of the failure of the first access point device to communicate with the service provider.

The present principles also relate to a first access point device comprising a processor, a memory, a wide area network interface and a wireless local area network interface, configured to detect a failure of the first access point device to communicate via the wide area network interface with a service provider of the first access point device. The processor, the memory, the wide area network interface and the wireless local area network interface, are further configured to send, via the wireless local area network interface, at least one probe request message on at least one wireless communication channel, the at least one probe request message comprising a payload enabling the at least one probe request message to be identified by at least a second access point device as a distress message representative of a reporting of the failure of the first access point device to communicate via the wide area network interface with the service provider of the first access point device, for reporting, by the at least a second access point device, the failure to the service provider.

According to a further aspect of the first access point device, the processor, the memory, the wide area network interface and the wireless local area network interface are further configured to select, for the sending of at least one probe request message, at least one wireless communication channel on which a probe response message was received in reply to a probe request message previously sent by the first access point device for scanning wireless local area networks in proximity of the first access point device.

According to a further aspect of the first access point device, the processor, the memory, the wide area network interface and the wireless local area network interface are further configured to select, for the sending of at least one probe request message, at least a second access point having a same service provider as the first access point device, the same service provider being identified from information comprised in the probe response message.

According to a further aspect of the first access point device, the processor, the memory, the wide area network interface and the wireless local area network interface are further configured to include in the payload a Medium Access Control address of the wide area network interface of the first access point device.

According to a further aspect of the first access point device, the processor, the memory, the wide area network interface and the wireless local area network interface are further configured to include in the payload an Internet Protocol address of the first access point device.

According to a further aspect of the first access point device, the processor, the memory, the wide area network interface and the wireless local area network interface are further configured to include in the payload parameters of the first access point device, formatted according to a Technical Report-069 data model.

According to a further aspect of the first access point device, the processor, the memory, the wide area network interface and the wireless local area network interface are further configured to include in the payload parameters of the first access point device, formatted according to a Simple Network Management Protocol.

According to a further aspect of the first access point device, the first access point is a gateway.

According to a further aspect of the present principles, there is provided a second access point device comprising a processor, a memory, a wireless local area network interface and a wide area network interface, configured to receive from a first access point and via the wireless local area network interface at least one probe request message on at least one wireless communication channel, the at least one probe request message comprising a payload enabling the at least one probe request message to be identified by the second access point device as a distress message representative of a reporting of a communication failure between the first access point and the service provider over a wide area network interface of the first access point. The processor, the memory, the wireless local area network interface and the wide area network interface are further configured to report the communication failure to the service provider of the first access point via the wide area network interface of the second access point device.

BRIEF DESCRIPTION OF THE DRAWINGS

More advantages of the present disclosure will appear through the description of particular, non-restricting embodiments. To describe the way the advantages of the present disclosure can be obtained, particular descriptions of the present principles are rendered by reference to specific embodiments thereof which are illustrated in the appended drawings. The drawings depict exemplary embodiments of the disclosure and are therefore not to be considered as limiting its scope. The embodiments described can be combined to form particular advantageous embodiments. In the following figures, items with same reference numbers as items already described in a previous figure will not be described again to avoid unnecessary obscuring the disclosure. The embodiments will be described with reference to the following drawings in which:

FIG. 5 is an example probe request format.

It should be understood that the drawings are for purposes of illustrating the concepts of the disclosure and are not necessarily the only possible configuration for illustrating the disclosure.

DETAILED DESCRIPTION

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Figure 1:
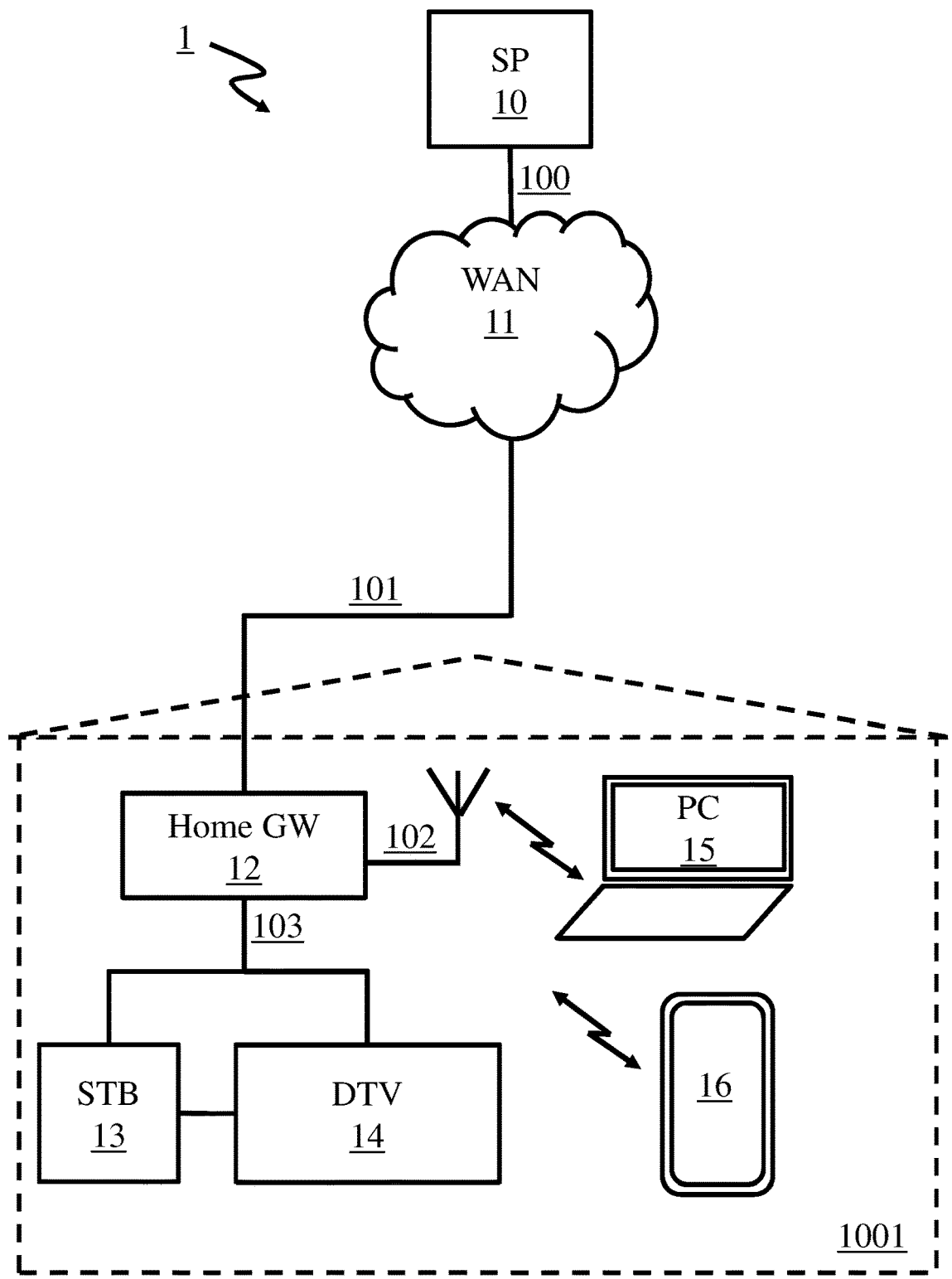
FIG. 1 is a typical subscriber home connected to a service provider.

FIG. 1 is a typical subscriber home connected to a service provider. The system 1 includes a Service Provider SP 10, connected to a Wide Area Network WAN 11 via link 100, and a subscriber home 1001. Subscriber home 1001 includes a gateway GW 12. Gateway 12 provides a wired and wireless Access Point (AP) for home network LAN devices Set Top Box STB 13, Digital Television DTV 14, Personal Computer PC 15, and smartphone 16. Gateway 12 is provided to the subscriber in the context of a triple-play offer by service provider 10 for combined Internet, telephony and IPTV services. Gateway 12 includes several network interfaces, a first, wide area, interface enabling connection 101 with WAN 11, a second, local area, network interface enabling wired connections 103 with wired LAN devices 13 and 14, and a third, wireless local area, network interface enabling wireless connections 102 with wireless LAN devices PC 15 and smartphone 16. In the system 1, a failure of link 101 between the subscriber gateway 12 and the service provider 10 can be very annoying to a subscriber as all services, Internet, telephony, and IPTV are affected. Such failures account for a high proportion of calls to the service provider's helpdesk.

Figure 2:
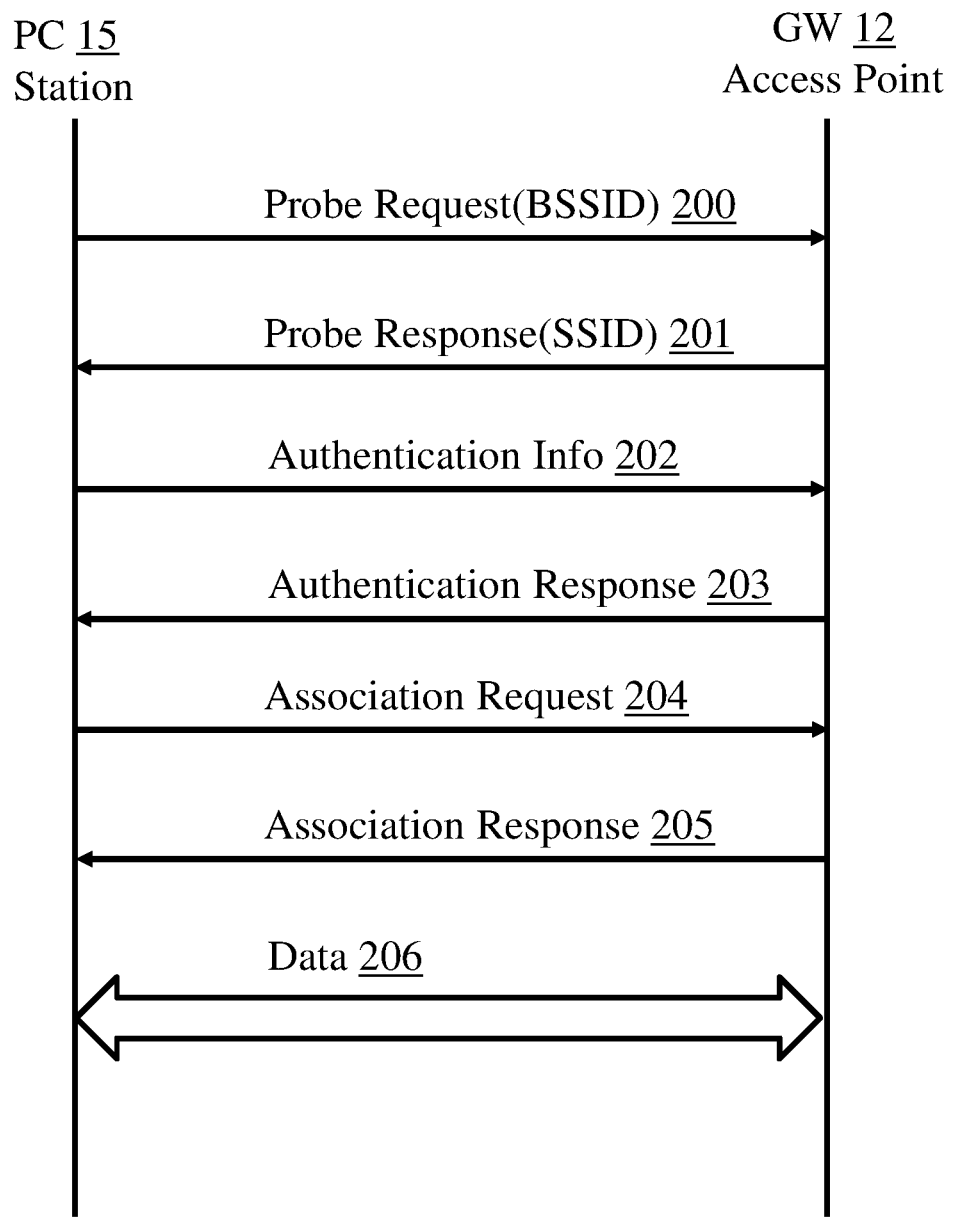
FIG. 2 is a sequence diagram of wireless communication set up between a wireless device and an access point.

FIG. 2 is a sequence diagram of WiFi (a trademark of the Wi-Fi Alliance, a technology for wireless LAN based on IEEE 802.11 standards) communication set up between PC 15 (or smartphone 16) and gateway 12. In terms of WiFi, PC 15 is a mobile station (STA), and gateway 12 is an access point (AP). The mobile station PC 15 starts out as being not authenticated and not associated. As part of network discovery, the mobile station PC 15 broadcasts probe request messages 200 to discover WiFi networks in its proximity. These probe requests advertise the mobile station supported data rates and WiFi capabilities. The probe request is transmitted to destination layer-2 address and BSSID (Media Access Control (MAC) address or hardware address of the WiFi chipset running on a wireless access point) of FF:FF:FF:FF:FF:FF (hexadecimal notation) and all AP's that receive the message will respond. APs such as gateway 12 receiving the probe request will send a probe response 201 is sent advertising the Service Set IDentifier (SSID, =wireless network name), supported data rates, encryption types, and wireless capabilities of the AP. The mobile station PC 15 chooses (automatically according to a preference, or based on a manual user choice) a network from the probe responses it receives, and the association process starts. The mobile station sends 202 authentication information (authentication frame) to the chosen AP (here, to GW 12). Access point GW 12 receives the authentication frame and responds 203 to the mobile station PC 15. The mobile station PC 15 transmits an association request 204 to the chosen access point GW 12. Access point GW 12 receives the association request 204 and responds with an association response 205. Authentication and association request frames and replies have a format known in the art and are not further detailed here. The mobile station PC 15 is now fully associated with access point GW 12 and data transfer starts 206. The probe requests are transmitted on all channels and the transmission of probe requests is a preamble to an association between a station and an access point. "Probing" or transmitting probe requests is commonly used in IEEE802.11 to achieve a plurality of goals, such as active scanning for present networks, but also for presence detection and link activity detection.

Figure 3:
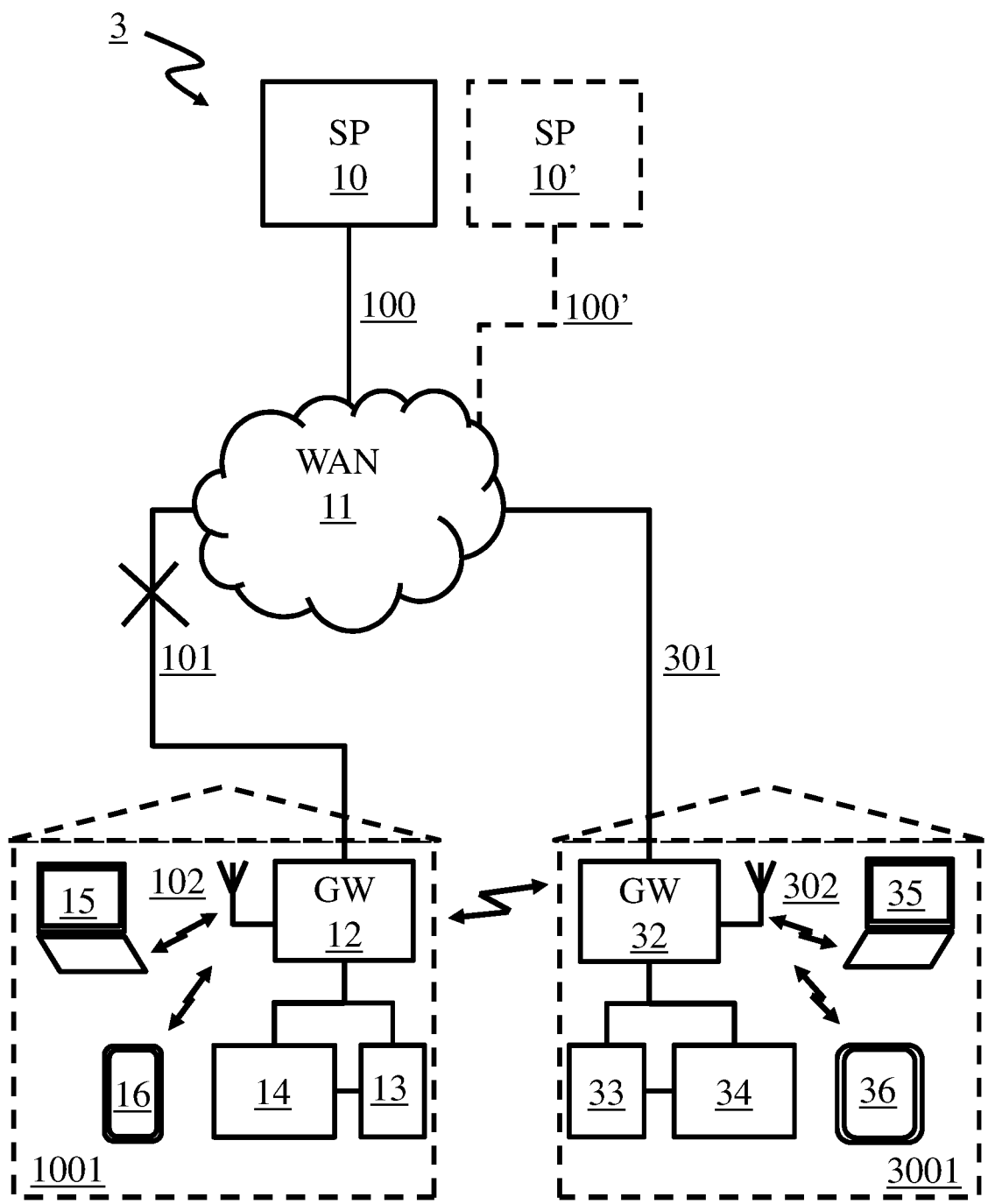
FIG. 3 is a network infrastructure including several subscribers to a same service provider.

FIG. 3 is a network infrastructure including several subscribers to a same service provider 10, or to different service providers (10 and 10'). The infrastructure 3 includes a first home 1001 of a first subscriber and a second home 3001 of a second subscriber. Second home 3001 includes a second gateway 32. The second gateway 32 in the second home 3001 further includes a wireless network 302. The second gateway 32 includes a second LAN with LAN devices 33-36. The first gateway 12 in the first home 1001 is disconnected from WAN 11 because link 101 is broken. The second gateway 32 in the second home 3001 is still connected to WAN 11 via link 301. Gateways 12 and 32 in respectively the first home 1001 and in the second home 3001 are within WiFi communication range of each other.

In the following, the terms 'gateway' (GW), 'access point' (AP) and 'wireless access point' (WAP) are used indifferently for meaning the same. This means that a gateway as mentioned in the following is also a (wireless) access point. In computer networking, a wireless access point is a networking hardware device that allows a wireless network compliant device to connect to a network. Therefore, the present principles may apply to other types of access points than gateways, such as mobile devices acting as a wireless access point, e.g., offering a WiFi or WiMAX wireless access point to LAN devices and a 4G/5G/LTE wireless connection to a WLAN for the LAN devices connected to it.

Figure 4:
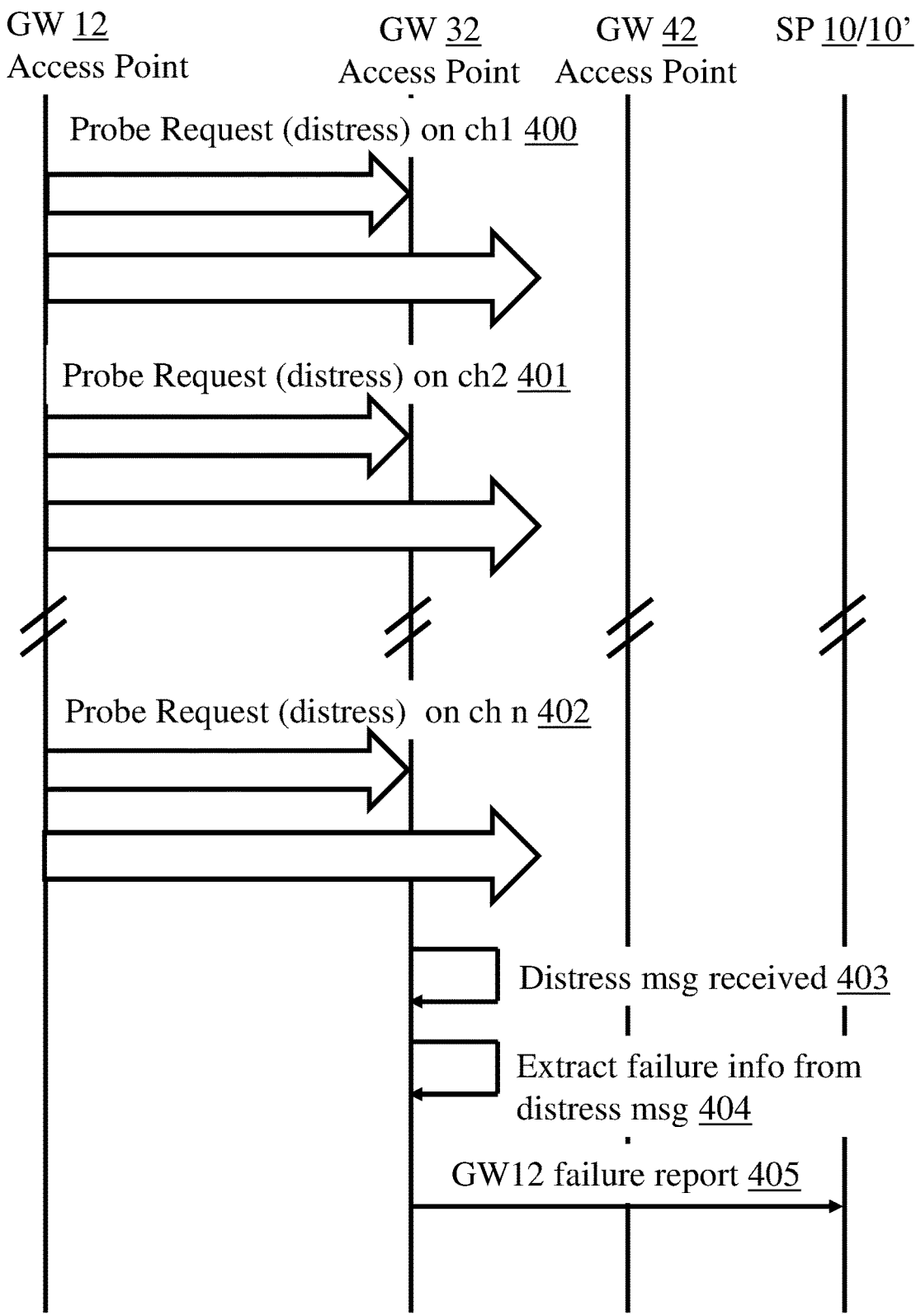
FIG. 4 is a sequence diagram illustrating an embodiment of a method of connectivity failure reporting per some principles of the present disclosure.

FIG. 4 is a sequence diagram illustrating an embodiment of a method of connectivity failure reporting per some principles of the present disclosure. The embodiment includes transmission of probe request distress messages (distress messages), i.e., probe request messages with a specific payload, which, when received by an access point, are identified by their specific payload as being distress messages. A fault monitor function in gateway 12 in the first home 1001 detects a prolonged interruption or severe communication errors in its communication with its SP 10 via link 101, which prevents gateway 12 from communicating with its service provider SP 10. Similar to messages 200 with reference to FIG. 2, gateway 12 broadcasts (sends) probe request distress messages 400-402 on all RF channels 1 to n, in the hope of a probe request distress message to be received by a gateway within reach of the RF signal. The probe request distress messages transmitted are different from messages 200 in that these are probe request messages with a specific payload according to the present principles. The specific payload enables identification by a receiving access point/gateway as being distress messages. FIG. 4 illustrates receipt of a probe request distress message by only one gateway GW 32. For example, n=8 and a probe request distress message transmitted on channel eight is received, 403, by gateway 32. A gateway 42 is not within RF signal reach and does not receive the probe request distress message transmitted by gateway 12. Alternatively, gateway 42 may be within RF signal reach and receives the probe request distress message from gateway 12 but discards it as gateway 42 is not a gateway of a subscriber to a service offer from service provider SP 10. Alternatively, gateway 42 may be within RF signal reach and receives the probe request distress message from gateway 12 and does not discard it even if gateway 42 is not a gateway of a subscriber to a service offer from service provider SP 10, but gateway 42 is a gateway of a subscriber to a service offer from service provider SP 10'. Gateway 32 extracts 404 information from the probe request distress message received, such as identification information of gateway 12 and further information related to the nature of the failure as present in the payload of the probe request distress message. Gateway 32 may include further information in a failure report message that it transmits 405 over link 301 to service provider SP 10 of gateway 12. A gateway/access point receiving a distress message and transmitting the failure report message is also referred to as the 'forwarding' gateway/access point hereinafter. Service provider SP 10 receives the failure report and is thereby informed of the connectivity failure of gateway 12 without any user intervention. This mechanism advantageously enables a service provider to be aware of such problems and their nature even in the absence of the subscriber, e.g., when the subscriber is not using his gateway. If many failures of a same nature are reported by a number of distressed gateways in a same communication path, the service provider may conclude that the problem is caused by a failing router or otherwise failing communication link between the router and the service provider in the communication path between the service provider and the plurality of distressed gateways. Following analysis of the failure report and possibly analysis of failure reports received from other gateways, the service provider's service platform can take appropriate measures such as rebooting a failing router or Dynamic Host Configuration Protocol (DHCP) server in the network path to gateway 12, downloading and installing a new router software or DHCP server software, or physical replacing or repairing a network equipment in the communication link between the distressed gateway/access point and the service provider or physically replacing or repairing the communication link diagnosed as failing. As can be observed, the communication between the distressed gateway and the forwarding gateway does not go beyond the transmission of probe request messages, i.e., there is no association and data exchange between gateways. A complete data communication setup would require the distressed gateway to play the role of a station, see FIG. 2. Gateways are per definition access points and often do not have the software nor the hardware (wireless communication chipset) required to be stations. The broadcasting of probe requests by access points is used by access points to scan for and determine least used channels, and the appropriate access point software and hardware (wireless communication chipset) is thus provided for the scan function. The feature, according to the present principles, of broadcasting of distress messages based on broadcasting of probe requests by an access point does therefore advantageously not require hardware modifications, nor does it require important software modifications. As such, the present principles can be easily implemented as a high-level upgrade destined to a heterogenous set of gateways.

FIG. 5 is an example probe request format as specified in the IEEE802.11 standard. The specific payload that makes it a probe request distress message is included in the Vendor Specific field for compatibility with IEEE802.11. Vendor specific fields are formatted as follows:

$$<vendor\text{-}specific\ tag><OUI><vendor\text{-}specific\text{-}type><data> \quad (1)$$

OUI is an Organization Specific Identifier. The vendor-specific tag (1) can be repeated several times, until the probe request frame size is exhausted. The probe request frame size can be up to 2300 bytes, so it can be assumed that 2000 bytes are available for the specific payload. Roughly 1920 bytes of payload data is then available after subtraction of header information. According to a particular embodiment, a single payload message is used. OUI in the probe request distress message may represent the company/brand of the device issuing the message or the service provider having provided the device and from which a user of the device has subscribed to a service offer. An incremental numerical value (sequence number) is used for the vendor specific type field, so that probe request distress messages can be ordered; e.g., first probe request distress message has a numerical value of 0, the last probe request distress message has a numerical value of n. For the example probe request distress message, the <data> field is organized as follows:

Message Type: 1 byte. "Distress message"=0x01.
Authentication information:
  Device Certificate –250 bytes;
  Random number (4 bytes, see next field);
  Digital message signature: Encryption using the distressed device's private key over a hash of the random number+device certificate (160 bytes if using SHA1);
Addressing:
  Distressed device's MAC Address (if not already included in the certificate): 6 bytes
  Distressed Device's last known IP address: 4 bytes
  Service provider's IP address: 4 bytes
Distressed device's data for diagnostic purposes:
  System uptime: 4 bytes
  Latest log data: 160 bytes of textual data
  Configuration summary: 240 bytes
  Link Data: various pieces of device parameters information formatted according to the applicable management data model, e.g. TR-069.

Digital message signature and device certificate are security related fields are not further described here and can be formatted according to techniques known in the art.

Further information may be included in the data field of the probe request distress message, as appropriate to the distressed device and encoded with Type-Length Value (TLV). Other data models than TR-069 may be used, e.g., SNMP.

The above probe request distress message format is included as an example. A probe request distress message may have any different format, proprietary or standardized, but would at least require that the message is understood by a receiving gateway as being a distress message. Therefore, such message would comprise information representative of the message being a distress message. Furthermore, the probe request distress message would at least include information (device identifier) that would enable a service provider receiver of the message to identify the distressed gateway in the network.

According to a particular embodiment, the distressed gateway includes, as mentioned in the above example distress message format, its last used IP address in the probe request distress messages that it broadcasts (sends).

According to a particular embodiment, the distressed gateway includes, information enabling to identify the service provider. This enables a receiver device of the distress message to identify for which service provider the distress message is destined (e.g., 10 or 10'), and may be advantageous when receiver devices only forwards distress messages destined to its 'own' provider and discard distress messages destined to other than its 'own' provider. According to a particular embodiment, this information is included in the probe request distress message as an additional field. According to a particular embodiment, the OUI is used to include this information.

According to a particular embodiment, a receiver device of a distress message verifies the service provider information with its own service provider and if it is the same, it transmits a probe response message with the same service provider information to the distressed gateway. The distressed gateway receiving a probe response verifies if the service provider information in the probe response match to its 'own' service provider. If they match, the distressed gateway 'knows' that the distress message was received by a 'friendly' gateway present on the specific channel on which the distress message was broadcasted and that the distress message will be forwarded by the friendly gateway to the provider IP address in the distress message.

Alternatively or additionally, as mentioned in the above example distress message format, the distressed gateway includes its Media Access Control address of the concerned WAN interface (connected to the failing communication link) in the broadcasted probe request distress messages. The MAC address is a unique identifier assigned to network interfaces of a device. MAC addresses are used as a network address for most IEEE802 network technologies, including Ethernet and WiFi. MAC addresses are most often assigned by the manufacturer of a Network Interface Controller (NIC) in a device and are stored in its hardware. When a MAC address is assigned by the NIC device manufacturer, it usually encodes the manufacturer's registered identification number and may be referred to as the burned-in address (BIA). It may also be known as an Ethernet hardware address (EHA) or hardware address. This address can be contrasted to the previous mentioned IP address, which is assigned to the device during an IP address negotiation e.g., via the DHCP protocol, and which therefore may vary.

Alternatively or additionally, the distressed gateway includes its serial number in the broadcasted probe request distress messages.

According to a particular embodiment, the broadcasted probe request distress messages include further data enabling failure diagnostics by the service provider's service platform. Such data may include Bit Error Rate (BER), number of lost packets, signal strength, or any other data that may be helpful for diagnosing the cause of the communication problem encountered. This information may be formatted according to TR-069 or SNMP, for example.

According to a particular embodiment, the broadcasted probe request distress messages include sequence numbers in case of the report data being too voluminous to be included in the payload of one probe request distress message.

According to a particular embodiment, the information in the broadcasted probe request distress messages is compressed for size reduction.

According to a particular embodiment that can be advantageously combined with any of the previous described embodiments, the probe request distress messages are broadcasted on a selected number of channels only or on a single selected channel. While in principle the above discussed scan for least used channels is used by prior art access points/gateways to determine least used channels and for using these channels for wireless communication with its wireless LAN devices with the aim to avoid data collision with channels used by neighboring access points, the result of such scan is surprisingly and advantageously used according to the present principles to select one or more most used channels that are to the contrary used by neighboring access points and to broadcast probe request messages on the selected one or more used channel(s). This embodiment advantageously improves the efficiency of the broadcasting of probe request distress messages as it targets the broadcast on channels on which it is likely to find a neighboring gateway that uses one of the selected channels and that listens on one of the selected channels, and avoids occupying unused channels and wasting time and energy on broadcasting distress messages on channels on which no neighbor device is listening anyway.

According to a particular embodiment that can be advantageously combined with any the previously described embodiment, the previously discussed scan for channels used by neighboring access points ('used channels') is performed when an anomaly is detected on the main communication link between a gateway ('the distressed gateway') and its service provider in the WAN. This way, the distressed gateway can target its distress messages to an updated selection of one or more used channel(s) and improve the efficiency of the broadcasting of distress messages. According to a particular embodiment, the previously discussed scan for used channels is performed regularly during the duration of the broadcasting of distress messages to adapt to changes in the list of used channels.

According to a particular embodiment, the distressed gateway pauses or stops broadcasting distress messages after expiration of a time out period. This advantageously avoids that the broadcasting of distress messages perturbs communication between neighboring gateways and between those neighboring gateways and their LAN devices.

Figure 6:
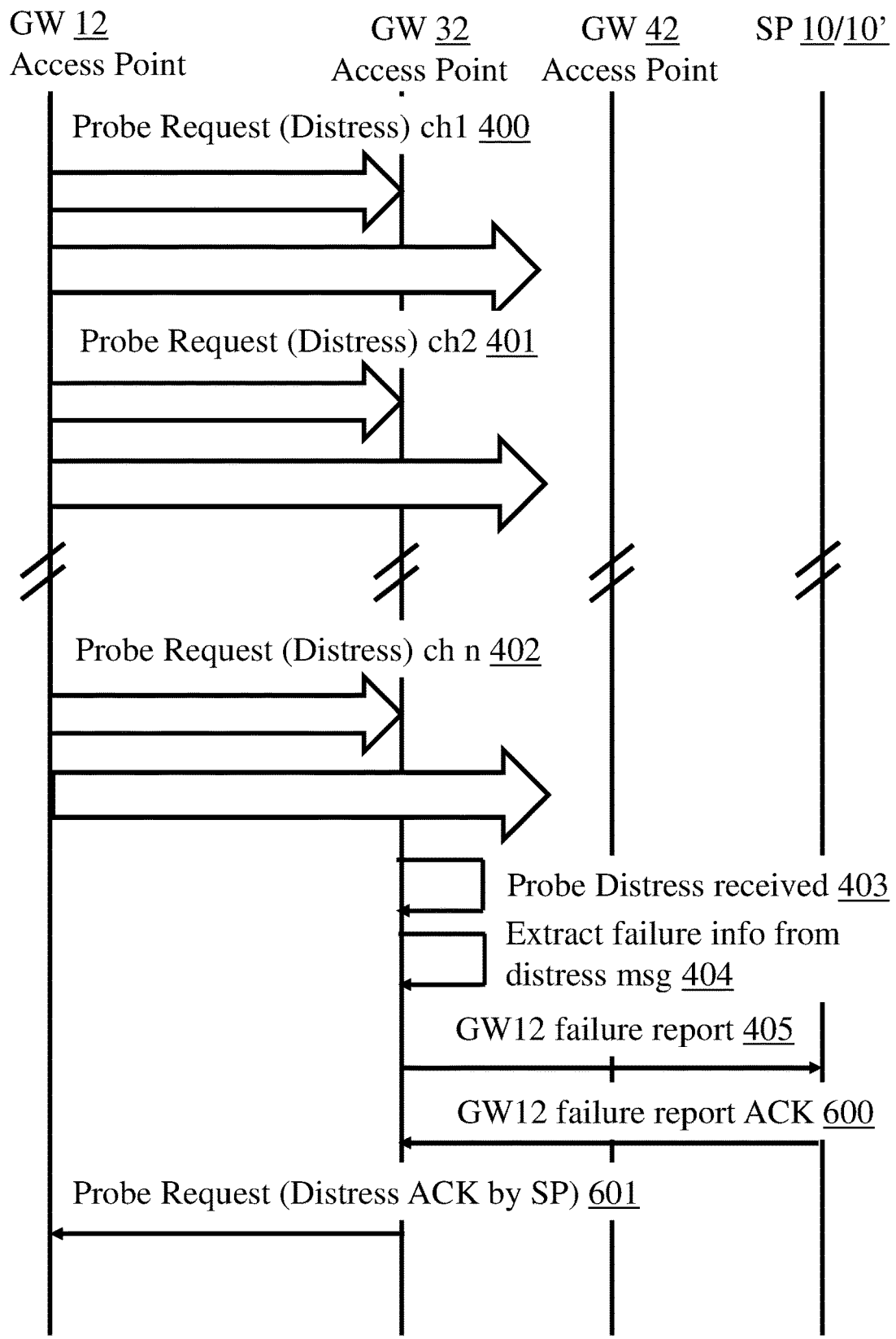
FIG. 6 is a sequence diagram illustrating a further embodiment of a method of connectivity failure reporting per some principles of the present disclosure.

FIG. 6 is a sequence diagram illustrating a further embodiment of a method of connectivity failure reporting per some principles of the present disclosure. The embodiment includes creation of a two-way communication path between a distressed gateway and a neighboring gateway and ultimately a service provider's service center based solely on the probe request mechanism. After having received the failure report 405 from gateway GW 32 neighboring the distressed gateway GW 12, the service provider 10 of the distressed gateway 12 sends a distress message acknowledge 600 to GW 32. The gateway 32, in turn, informs the distressed gateway GW 12 of the receipt of the distress message acknowledge in the form of a probe request message 601 with a specific payload marking it as a distress message receipt acknowledge by broadcasting (sending) it on a channel on which the distress message was received from the distressed gateway 12. Advantageously, this enables the distressed gateway 12 to learn that the distress message has been received and has been considered.

According to a particular advantageous embodiment, the broadcasting of distress messages is stopped when a distress message receipt acknowledge is received.

According to a particular embodiment, the distress message acknowledge includes information related to the identity of the forwarding gateway, here GW 32. According to a particular embodiment, this information includes an SSID (network name) of the wireless network of the forwarding gateway (here GW 32). This enables the distressed gateway to identify the network used by the forwarding gateway and may eventually useful for any further communication between the distressed gateway and the forwarding gateway.

According to a further embodiment, the transmission of the failure report 405 and the receipt of the acknowledge message from the service provider 600 are according to a remote management protocol such as SNMP or TR-069.

According to a further embodiment, the distress message receipt acknowledge message comprises further information such as an indication of a cause of the communication failure between the service provider 10 and the distressed gateway 12 and an expected time for return to normal operation. Such information can be advantageously being shown in a popup message on a display device in the distressed gateway's LAN to keep a subscriber to the services offering of the service provider 10 informed about the status of the communication problems encountered and improves customer satisfaction and avoids overloading call centers and helpdesks if many subscribers are experiencing communication problems caused by an important failure in the network 11.

According to a further embodiment, the distress message receipt acknowledge message comprises further information such as instructions and updates for the distressed device that would enable the distressed device to repair a local cause of the communication failure. As previously mentioned for probe request distress messages, probe request distress message acknowledge messages may include sequence numbers if the payload size is insufficient for the further information to be included in one probe request. In which case, the further information is transmitted to the distressed device in a series of probe requests having the distressed device's SSID and having following sequence numbers and each message of the series preferably including the first and the last sequence number.

Figure 7:
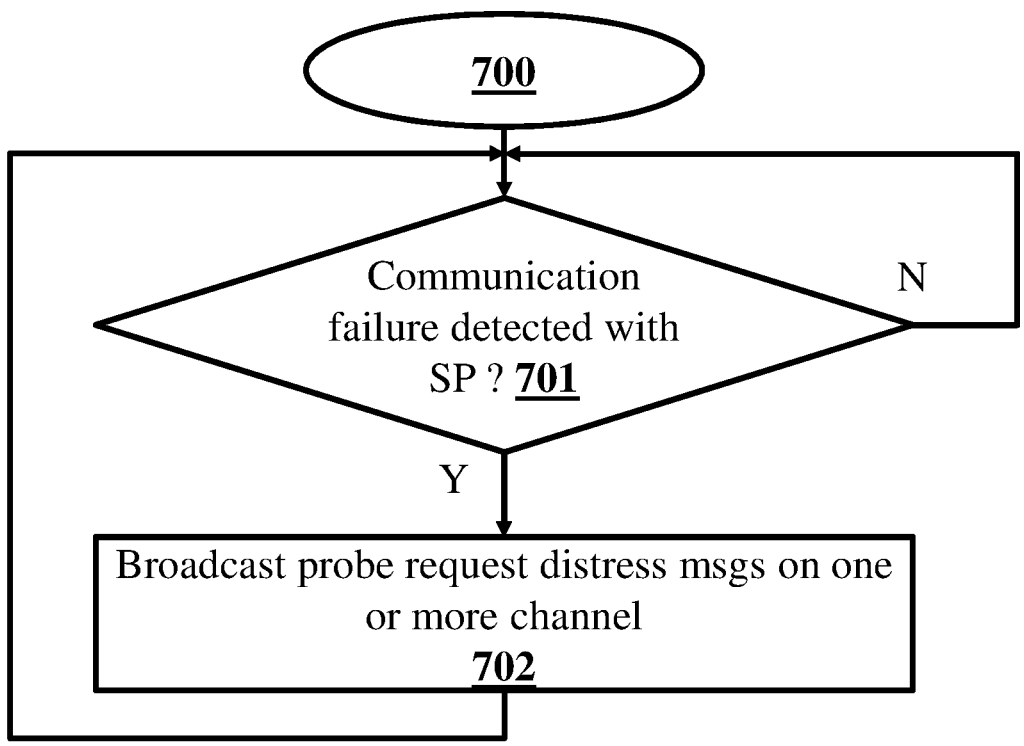
FIG. 7 is a flow chart of an embodiment of a method of connectivity failure reporting per the principles of the present disclosure as implemented by an access point detecting a communication failure with the service provider.

FIG. 7 is a flow chart 700 of an embodiment of a method of communication failure reporting per the principles of the present disclosure as implemented by the access point 12 detecting a communication failure with its service provider 10. The method is for example implemented by gateway 12 of FIG. 3. In a first step 701, it is determined if a communication failure is detected on a communication link 101 between the access point 12 and its service provider 10 or if a failure of access point 12 to communicate via its wide area network interface (802) with its service provider 10 is detected. Step 701 is repeated if no communication failure is detected (701-N). Having detected a communication failure (701-Y), the access point 12 broadcasts (sends) in a step 702 one or more probe request messages on one or more wireless communication channels. The broadcasted probe request messages are particular probe request messages according to the present principles in that they have a specific payload that enables one or more second access points 32 receiving the probe request messages to recognize these probe request messages as distress messages, that are representative of a reporting of a failure of the communication on the communication link 101 between the first access point 12 and its service provider 10, or of a failure of the first access point 12 to communicate with its service provider 10 via its wide area network interface 802. The one or more second access points 32 receiving the distress message reports the communication failure to the service provider 10 of access point 12, e.g., access point 32 may report the communication failure to service provider 10 via WAN 11 using its own wide area network interface 902.

Figure 8:
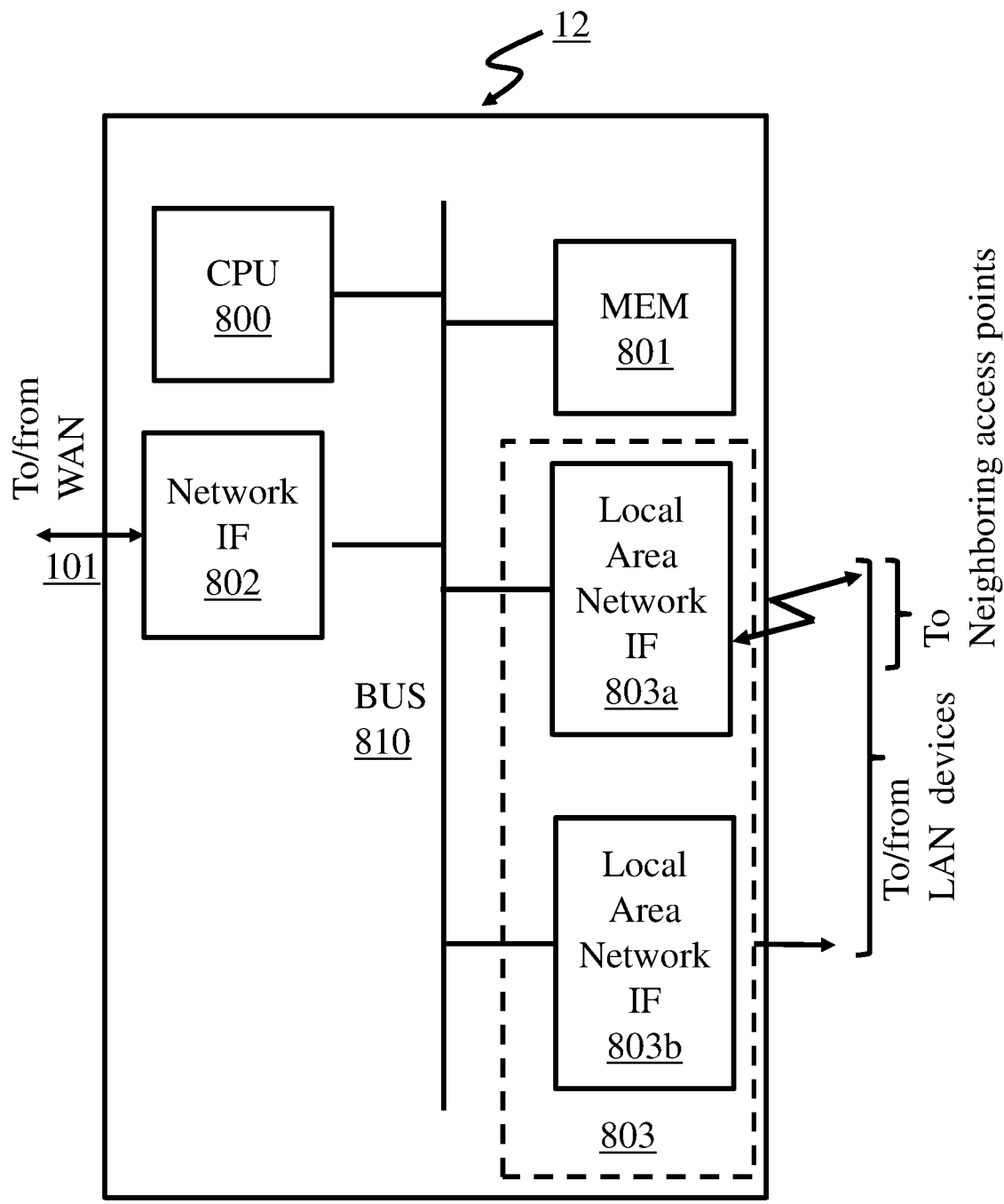
FIG. 8 is an embodiment of an access point 12 with a processor and memory for implementing the methods per the principles of the present disclosure.

FIG. 8 is an embodiment of an access point 12 suitable for implementing the method per the principles of the present disclosure. The device 12 includes a processor or central processor or processing unit 800, a memory 801, a wide area network interface 802 for connection of the access point to the WAN 11 and to service provider 10 via communication link 101, and a local area network interface 803 for connection to LAN devices 13-16. Network interface 803 is split into two network interfaces 803a and 803b, for respectively wireless communication and wired communication with LAN devices 13-16 e.g., wireless local area network interface 803a for wireless WiFi connections with devices 15 and 16 and wired local area network interface 803b for wired Ethernet connection with devices 13 and 14. Processor 800 detects communication failures on the communication link 101 with service provider 10 or failure of the access point 12 to communicate with its service provider 10 via its wide area network interface 802. Having detected the communication failure, the network interface 803a is used for broadcasting (sending) probe request distress messages on one or more wireless communication channels, which may be received by one or more neighboring access points (e.g., access point 32) which will report the failure to service provider 10 via their own communication link with WAN 11 (e.g., via communication link 301).

Figure 9:
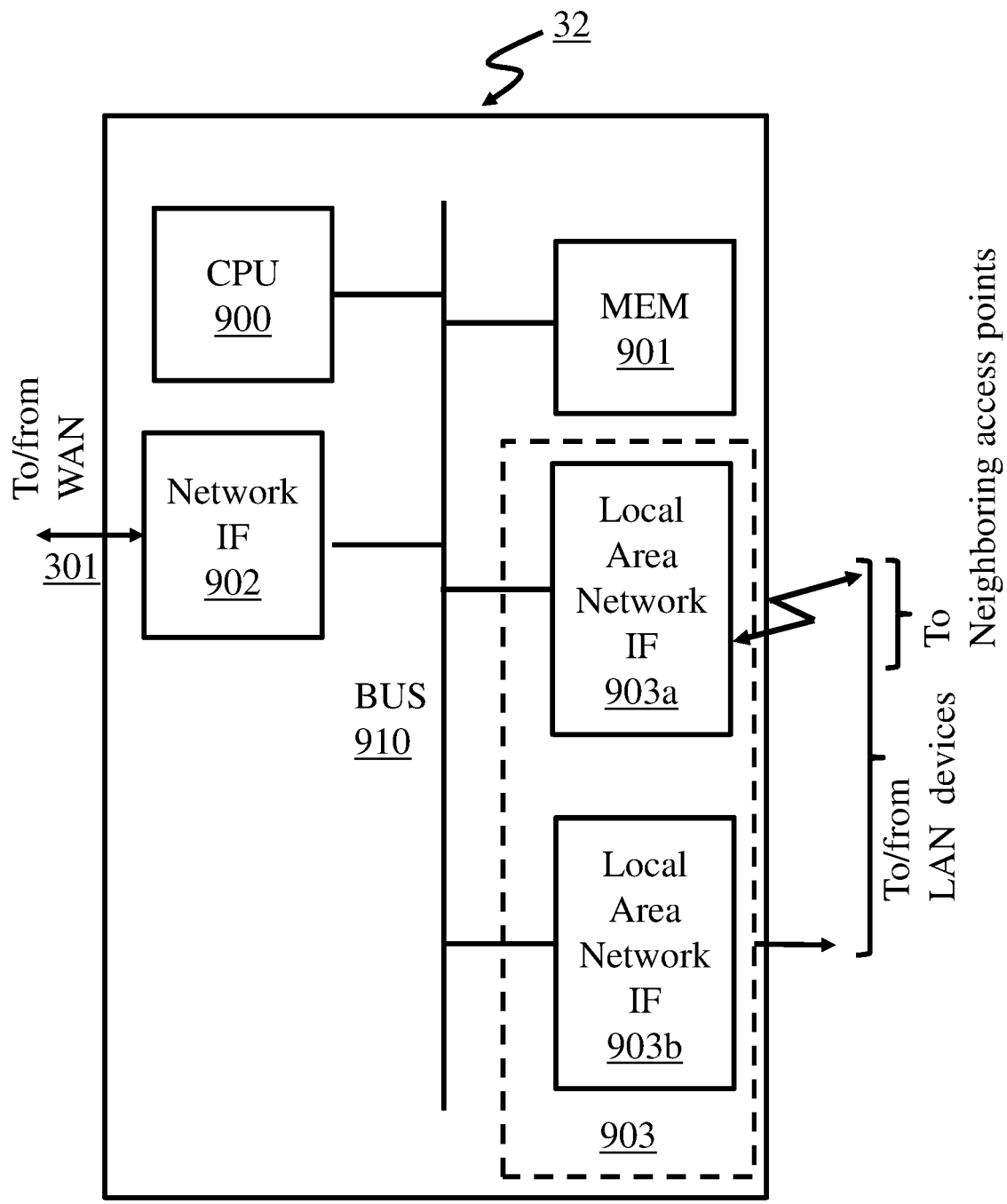
FIG. 9 is an embodiment of an access point 32 suitable for implementing the method per the principles of the present disclosure.

FIG. 9 is an embodiment of an access point 32 suitable for implementing the method per the principles of the present disclosure. While FIG. 8 is that of a transmitter of distress messages, FIG. 9 is that of a receiver of distress messages (distress message forwarding device).

The device 32 includes a processor or central processor or processing unit 900, a memory 901, a wide area network interface 902 for connection of the access point to WAN 11 and to service provider 10 or 10' (the service provider of access point 32 may be the same service provider 10 as the service provider for access point 12, or may be a different service provider 10') via communication link 301, and a local area network interface 903 for connection to LAN devices 33-36. Local area network interface 903 is split into two local area network interfaces 903a and 903b, for respectively wireless communication and wired communication with LAN devices 33-36 e.g., wireless local area network interface 903a for wireless WiFi connections with devices 35 and 36 and wired local area network interface 903b for wired Ethernet connection with devices 33 and 34. One or more probe request messages are received on a wireless communication channel from a distressed access point 12 via wireless local area network interface 903a and are recognized by processor 900 as one or more distress message representative of a reporting of a communication failure between access point 12 and its service provider 10 over the wide area network interface (802) of access point 12. Processor 900 recognizes the one or more probe request messages as being one or more distress messages because of their specific payload. When processor 900 has recognized the one or more probe request messages as being one or more distress messages, it reports, via its own wide area network interface 902, the failure to the provider 10 of the access point device 12 from which the one or more distress messages were received.

Figure 10:
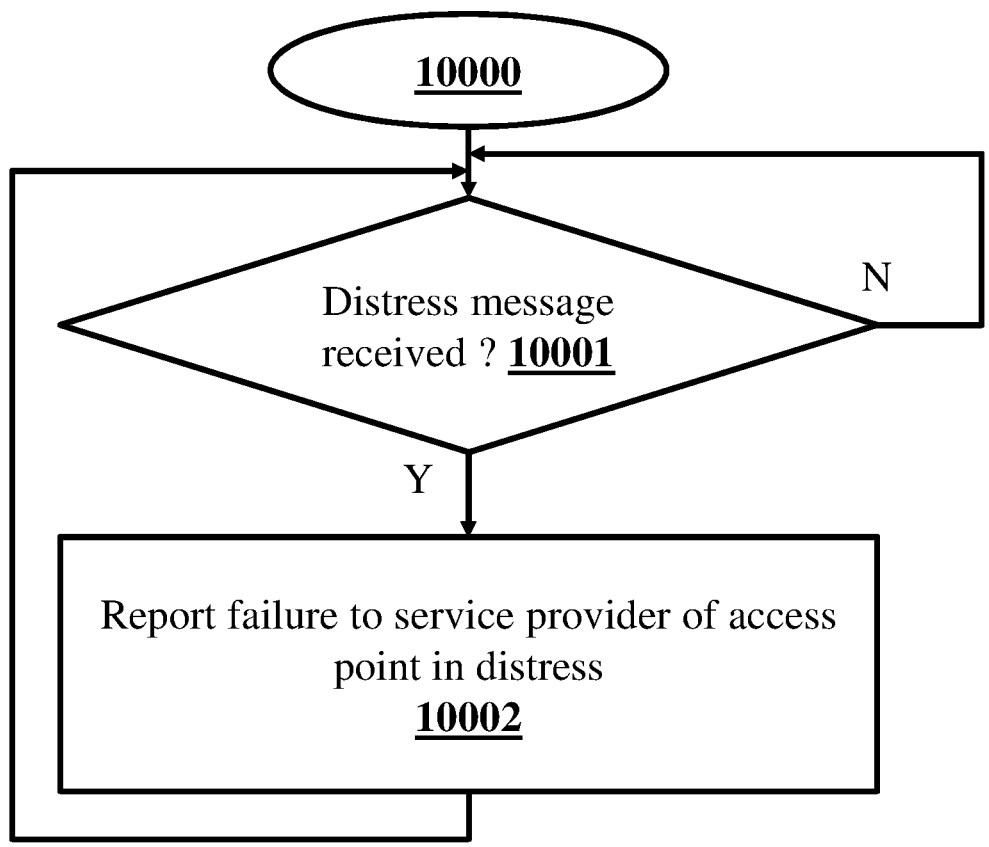
FIG. 10 is a flow chart of an embodiment of a method of communication failure reporting per the principles of the present disclosure as implemented by an access point 32 receiving one or more probe request messages according to the present principles.

FIG. 10 is a flow chart of an embodiment of a method 10000 of communication failure reporting per the principles of the present disclosure as implemented by an access point receiving one or more probe request messages according to the present principles. The method is for example implemented by access point 32. In a first step 10001, it is determined if the access point 32 receives, on a wireless communication channel used by access point 32 for a local area network of access point 32, at least one probe request message according to the present principles. If no distress message is received, step 10001 is repeated (10001-N). If however a distress message is received, step 10002 is engaged. In this step a reporting is done by access point 32, via a wide area network interface 902 of access point 32, to the service provider 10 of access point 12, of a failure of access point 12 to communicate with its service provider 10. Access point 32 recognizes if a probe request message is a distress message according to the present principles if the probe request message comprises a payload identifying the probe request message as a distress message representative of a failure of the access point 12 to communicate with its service provider 10.

It is to be appreciated that some elements in the drawings may not be used or be necessary in all embodiments. Some operations may be executed in parallel. Embodiments other than those illustrated and/or described are possible. For example, a device implementing the present principles may include a mix of hard- and software.

It is to be appreciated that aspects of the principles of the present disclosure can be embodied as a system, method or computer readable medium. Accordingly, aspects of the principles of the present disclosure can take the form of an entirely hardware embodiment, an entirely software embodiment (including firmware, resident software, micro-code and so forth), or an embodiment combining hardware and software aspects that can all generally be defined to herein as a "circuit", "module" or "system". Furthermore, aspects of the principles of the present disclosure can take the form of a computer readable storage medium. Any combination of one or more computer readable storage medium(s) can be utilized.

Thus, for example, it is to be appreciated that the diagrams presented herein represent conceptual views of illustrative system components and/or circuitry embodying the principles of the present disclosure. Similarly, it is to be appreciated that any flow charts, flow diagrams, state transition diagrams, pseudo code, and the like represent various processes which may be substantially represented in computer readable storage media and so executed by a computer or processor, whether such computer or processor is explicitly shown.

A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information there from. A computer readable storage medium can be, for example, but is not limited to, an electronic, magnetic, optical, electromagnetic, infrared, or semiconductor system, apparatus, or device, or any suitable combination of the foregoing. Some or all aspects of the storage medium may be remotely located (e.g., in the 'cloud'). It is to be appreciated that the following, while providing more specific examples of computer readable storage mediums to which the present principles can be applied, is merely an illustrative and not exhaustive listing, as is readily appreciated by one of ordinary skill in the art: a hard disk, a read-only memory (ROM), an erasable programmable read-only memory (EPROM or Flash memory), a portable compact disc read-only memory (CD-ROM), an optical storage device, a magnetic storage device, or any suitable combination of the foregoing.

The invention claimed is:

1. A method of communication failure reporting implemented by a first access point device, said method comprising:
    detecting, by said first access point device, a failure of said first access point device to communicate via a wide area network interface of said first access point device with a service provider of said first access point device;
    sending, by said first access point device operating in access point mode, AP mode, without the first access point device switching to station mode, STA mode, and without the first access point device establishing a connection in STA mode with said second access point device, via a wireless local area network interface of said first access point device, at least one probe request message on at least one wireless communication channel, said at least one probe request message comprising a payload enabling said at least one probe request message to be identified by at least a second access point device as a distress message representative of a reporting of said failure of said first access point device to communicate with said service provider via said wide area network interface of said first access point device, for generating a report and reporting, by said at least a second access point device, said failure to said service provider.

2. The method according to claim 1, further comprising selecting, for said sending of at least one probe request message, at least one wireless communication channel on which a probe response message was received in reply to a probe request message previously sent by said first access point device for scanning wireless local area networks in proximity of said first access point device.

3. The method according to claim 2, further comprising selecting, for said sending of at least one probe request message, at least a second access point device having a same service provider as said first access point device, said same service provider being identified from information comprised in said probe response message.

4. The method according to claim 1, wherein said payload further comprises a Medium Access Control address of said wide area network interface of said first access point device.

5. The method according to claim 1, wherein said payload further comprises an Internet Protocol address of said first access point device.

6. The method according to claim 1, wherein said payload further comprises parameters of said first access point device, formatted according to a Technical Report 069 data model.

7. The method according to claim 1, wherein said payload further comprises parameters of said first access point device, formatted according to a Simple Network Management Protocol.

8. A method of communication failure reporting implemented by a second access point device, said method comprising:
    receiving, from a first access point device operating in access point mode, AP mode, on a wireless communication channel used by said second access point device for a local area network of said second access point device, at least one probe request message, said probe request message being received by said second access point device without the first access point device having established a connection with said second access point device;
    generating, by the second access point device, a report of a failure of said first access point device to communicate with a service provider of said first access point device when said at least one probe request message comprises a payload identifying said at least one probe request message as a distress message representative of said failure of said first access point device to communicate with said service provider; and transmitting the report, via a wide area network interface of said second access point device, to the service provider of said first access point device.

9. A first access point device, the first access point device comprising a processor, a memory, a wide area network interface and a wireless local area network interface, configured to:

detect a failure of said first access point device to communicate via said wide area network interface with a service provider of said first access point device; and send, by said first access point device operating in access point mode, AP mode, without switching to station mode, STA mode, and without the first access point device establishing a connection with the second access point device, via said wireless local area network interface, at least one probe request message on at least one wireless communication channel, said at least one probe request message comprising a payload enabling said at least one probe request message to be identified by at least a second access point device as a distress message representative of a reporting of said failure of said first access point device to communicate via said wide area network interface with said service provider of said first access point device, for generating a report and reporting, by said at least a second access point device, said failure to said service provider.

10. The first access point device according to claim 9, wherein said processor, said memory, said wide area network interface and said wireless local area network interface are further configured to select, for said sending of at least one probe request message, at least one wireless communication channel on which a probe response message was received in reply to a probe request message previously sent by said first access point device for scanning wireless local area networks in proximity of said first access point device.

11. The first access point device according to claim 10, wherein said processor, said memory, said wide area network interface and said wireless local area network interface are further configured to select, for said sending of at least one probe request message, at least a second access point having a same service provider as said first access point device, said same service provider being identified from information comprised in said probe response message.

12. The first access point device according to claim 9, wherein said processor, said memory, said wide area network interface and said wireless local area network interface are further configured to include in said payload a Medium Access Control address of said wide area network interface of said first access point device.

13. The first access point device according to claim 9, wherein said processor, said memory, said wide area network interface and said wireless local area network interface are further configured to include in said payload an Internet Protocol address of said first access point device.

14. The first access point device according to claim 9, wherein said processor, said memory, said wide area network interface and said wireless local area network interface are further configured to include in said payload parameters of said first access point device, formatted according to a Technical Report-069 data model.

15. The first access point device according to claim 9, wherein said processor, said memory, said wide area network interface and said wireless local area network interface are further configured to include in said payload parameters of said first access point device, formatted according to a Simple Network Management Protocol.

16. The first access point device according to claim 9, wherein said first access point device is a home access gateway.

17. A second access point device comprising a processor, a memory, a wireless local area network interface and a wide area network interface, configured to:

receive from a first access point device operating in access point mode, AP mode, and via said wireless local area network interface at least one probe request message on at least one wireless communication channel, said probe request message being received from said first access point device without the first access point device having established a connection with the second access point device, said at least one probe request message comprising a payload enabling said at least one probe request message to be identified by said second access point device as a distress message representative of a reporting of a communication failure between said first access point and said service provider over a wide area network interface of said first access point;

generate a report based on said communication failure for said service provider of said first access point; and transmit the report to said service provider of said first access point via said wide area network interface of said second access point device.

* * * * *